US007627554B2

(12) United States Patent
Kruse et al.

(10) Patent No.: US 7,627,554 B2
(45) Date of Patent: Dec. 1, 2009

(54) UNIFORM FINANCIAL REPORTING SYSTEM INTERFACE UTILIZING STAGING TABLES HAVING A STANDARDIZED STRUCTURE

(75) Inventors: Geoffrey R. Kruse, Centennial, CO (US); Geoffrey R. Schlueter, Denver, CO (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 10/810,766

(22) Filed: Mar. 26, 2004

(65) Prior Publication Data

US 2005/0216497 A1 Sep. 29, 2005

(51) Int. Cl.
*G06F 17/30* (2006.01)
(52) U.S. Cl. ........................................ 707/3; 707/104.1
(58) Field of Classification Search ................. 707/1–3, 707/104.1
See application file for complete search history.

(56) References Cited

U.S. PATENT DOCUMENTS

| | | | | |
|---|---|---|---|---|
| 5,675,785 | A * | 10/1997 | Hall et al. .................... 707/102 |
| 5,680,614 | A * | 10/1997 | Bakuya et al. .......... 707/103 R |
| 5,701,461 | A * | 12/1997 | Dalal et al. ..................... 707/4 |
| 6,356,901 | B1 | 3/2002 | MacLead et al. ............... 707/6 |
| 6,631,382 | B1 * | 10/2003 | Kouchi et al. ................ 707/102 |
| 6,668,253 | B1 * | 12/2003 | Thompson et al. ............. 707/10 |
| 6,694,306 | B1 * | 2/2004 | Nishizawa et al. .............. 707/3 |
| 6,993,533 | B1 * | 1/2006 | Barnes ....................... 707/102 |
| 6,996,568 | B1 * | 2/2006 | Bedell et al. ................. 707/100 |
| 7,203,660 | B1 * | 4/2007 | Majeed ......................... 705/27 |
| 2001/0047372 | A1 | 11/2001 | Gorelik et al. .............. 707/514 |
| 2002/0065744 | A1 * | 5/2002 | Collins ......................... 705/27 |
| 2002/0111891 | A1 * | 8/2002 | Hoffman et al. .............. 705/36 |
| 2003/0061358 | A1 * | 3/2003 | Piazza et al. ................. 709/227 |
| 2003/0208460 | A1 * | 11/2003 | Srikant et al. ................... 707/1 |
| 2004/0059651 | A1 * | 3/2004 | MaGuire et al. .............. 705/30 |
| 2004/0064331 | A1 * | 4/2004 | Mayer et al. ..................... 705/1 |
| 2005/0144554 | A1 * | 6/2005 | Salmon et al. ........... 715/501.1 |
| 2005/0228777 | A1 * | 10/2005 | Kruse et al. ..................... 707/3 |
| 2006/0242160 | A1 * | 10/2006 | Kanchwalla et al. ......... 707/100 |
| 2007/0192362 | A1 * | 8/2007 | Caballero et al. ......... 707/104.1 |
| 2008/0030348 | A1 | 2/2008 | Pape et al. |

OTHER PUBLICATIONS

Ileana Balcu, Dulcian, Inc., "Don't Build 200 Reports, Build Just One!", Jan. 13, 2004, pp. 1-7.

(Continued)

*Primary Examiner*—Charles Rones
*Assistant Examiner*—Phuong-Thao Cao
(74) *Attorney, Agent, or Firm*—Alan G. Rego; Westman, Champlin & Kelly P.A.

(57) ABSTRACT

The present invention relates to a uniform financial reporting system interface, between a financial reporting tool and a general ledger database, which is capable of receiving a generalized request (non-database-specific request) from a report object or engine of a financial reporting tool. Based upon information included in the generalized request, the uniform interface accesses data from the general ledger database and returns the accessed data to the report object. The data is accessed from the general ledger database and returned to the report object by the uniform interface with the help of at least one staging table that has a standardized structure that is independent of a structure of the general ledger database.

14 Claims, 7 Drawing Sheets

OTHER PUBLICATIONS

Brad Eldredge, "Oracle General Ledger Technical Foundation", Aug. 20, 1999, pp. 1-41.

Mary Lou Weiss and Randy Giefer, Solution Beacon, LLC, Oracle Applications Release 11i Newsletter, Jun. 2003, vol. No. 10, pp. 1-22.

Randy Giefer, Computer Systems Authority, "Release 11I Applicattions DBA-Teaching An Old Dog New Tricks", published at least as early as Mar. 26, 2004, pp. 1-9.

"Data Transformation Services (DTS) in Microsoft SQL Server 2000", Sep. 2000, pp. 1-10.

"Together with Cognos Business Intelligence, Decisionstream Builds an Efficient End-to-End Business Solution-From the Rapid Integration of Disparate Data Sources to Efficient Analysis and Reporting on a Consistent Data Foundation", www.cognos.com, May 2001, Stock No. 29160, pp. 1-2.

T. Chenoweth, D. Schuff and R. St. Louis, "A Method for Developing Dimensional Data Marts", Communications of the ACM, Dec. 2003, vol. 46, No. 12, pp. 93-98.

F. Carino Jr., P. Kostamaa, A. Kaufmann and J. Burgess, "StorHouse Metanoia[1]-New Applications for Database, Storage & Data Warehousing", File Tek, Inc., May 21-24, 2001, pp. 521-531.

Lev Selector, "Informatica," Internet Article, Online, XP002349346, http://web.archive. org/web/20031223082519/http://selectorweb.com/informatica.html>, dated Dec. 23, 2003, pp. 1-8.

Anonymous, "Oracle9I Warehouse Builder 9.2," Oracle Technology Network, Internet Article, Online, XP002349347, http://www.aoracle.com/technology/products/warehouse/htdocs/datasheet92.htm?_temprelate=/ocom/technology/content/print>, dated 2003, pp. 1-6.

Anonymous, "Sunopsis: New Generation ETL for Business Objects", Internet article, XP002349348, dated 2003, http://www.sunopsis.com/corporate/us/download/documents/sunopsis_oc_bo.pdf, pp. 1-2.

Anonymous, "Intelligent Decision Support System-IDSS" Intelligent Science Research Group, Key Lab of IIP, Internet Article, Online, XP002349349, http://www.intsci.ac.cn/en/research/idss.html >, dated 2003, pp. 1-3.

* cited by examiner

Report -> 4100

On MEVANSNT

For the Twelve Months Ending December 31, 2000

| | CUR | YTD |
|---|---|---|
| 4100: | | |
| 1100-4100-001 Sales-Retail-Den | (674,260.00) | (7,400,612.00) |
| 1100-4100-002 Sales-Wholesale | (218,620.00) | (2,340,112.00) |
| 1100-4100-012 Sales-Internatio | (2,272,256.00) | (25,982,412.00) |
| 1200-4100-003 Sales-Service-L | (171,592.00) | (1,836,716.00) |
| 1200-4100-004 Sales-Service-St | (81,348.00) | (870,748.00) |
| 2100-4100-001 Sales-Retail-S.F. | (607,792.00) | (6,692,784.00) |
| 2100-4100-002 Sales-Wholesale | (212,320.00) | (2,272,648.00) |
| 2200-4100-003 Sales-Service-La | (114,904.00) | (1,229,876.00) |
| 2200-4100-004 Sales-Service-St | (71,180.00) | (761,872.00) |
| Total 4100 | (4,424,272.00) | (49,387,780.00) |

FIG. 5C

| Column Headers | A | B | C |
|---|---|---|---|
| 1 | | | |
| 2 | | CUR | YTD |
| 3 | | | |
| Column Detail | | | |
| Type (GL, Calc, etc): | DESC | GL | GL |
| Book Code/Attribute Category: | | ACTUAL | ACTUAL |
| Fiscal Year: | | BASE | BASE |
| Period Code: | | BASE | BASE |
| Current Per/YTD: | | CUR | YTD |
| Calc Formula: | | | |
| Column Width: | | | |
| Extra Spaces Before Col: | | | |
| Special Format Mask: | | | |
| Print Control: | | | |
| Column Restrictions: | | | |
| Reporting Unit: | | | |
| Currency Code: | | | |
| Currency Display: | | | |
| Currency Rate Subtype ID: | | | |
| Account Filter: | | (????-????-001) | |

FIG. 5D

UNIFORM FINANCIAL REPORTING SYSTEM INTERFACE UTILIZING STAGING TABLES HAVING A STANDARDIZED STRUCTURE

BACKGROUND OF THE INVENTION

The present invention relates to software systems for financial management of businesses. More specifically, the present invention relates to a uniform financial reporting system interface that utilizes staging tables having a standardized structure, which is not tied to a data schema or business rules of any particular general ledger system.

A general ledger is a storehouse for financial activity and history (accounting information) of a company. Currently, a number of different general ledger software systems are available for storing accounting information. Thus, each general ledger system, being utilized for storing accounting information, may be from a different vendor or on a different platform (Oracle, Informix, Microsoft SQL Server, etc.).

Financial reporting tools, which access and report information form general ledger databases, are widely known in the art and are widely available in the consumer market. Some prior art financial reporting tools include program code in their software to directly access a particular general ledger database (i.e., the program code (such as SQL statements) in the software of such reporting tools is tied to a structure or business rules of the particular general ledger database). One problem with such an approach is that, when a new interface to a new general ledger has to be added, the program code of the reporting tool needs to be modified to provide access to the new general ledger. Such modifications in the program code of the reporting tool could damage the access to the other general ledger database. Further, from a programming or coding standpoint, such an approach is very complex.

To overcome the above problem, one financial reporting system separates the general ledger database access code from the financial reporting tool software. Specifically, this system utilizes a uniform interface, which includes general ledger database access methods, that can receive a generalized request from a financial reporting tool and translate the generalized request into a specific query which, upon execution, retrieves data from a particular general ledger database. The uniform interface returns the retrieved data to the reporting tool. This technique simplifies the financial reporting system by allowing for separate development, testing, implementation and modification of the reporting tool for each specific general ledger system.

Although the above method helps overcome coding complexity problems arising from supporting multiple general ledger systems, there is a need to improve financial report execution performance when large general ledger databases are accessed.

SUMMARY OF THE INVENTION

The present invention relates to a uniform financial reporting system interface, between a financial reporting tool and a general ledger database, which is capable of receiving a generalized request (non-database/non-general-ledger specific request) from a report object or engine of a financial reporting tool. Based upon information included in the generalized request, the uniform interface accesses data from the general ledger database and returns the accessed data to the report object. The data is accessed from the general ledger database and returned to the report object by the uniform interface with the help of at least one staging table that has a standardized structure that is independent of a structure of the general ledger database.

BRIEF DESCRIPTION OF THE DRAWINGS

Appendix A includes certain methods utilized to carry out embodiments of the present invention.

DETAILED DESCRIPTION OF ILLUSTRATIVE EMBODIMENTS

The present invention relates, in general, to a uniform financial reporting system interface between a financial reporting tool and a general ledger database. More specifically, the present invention provides a uniform financial reporting system interface that utilizes staging tables having a standardized structure, which is not tied to a structure or business rules of any particular general ledger system. However, before describing the present invention in greater detail, one illustrative embodiment in which the present invention can be used will be discussed.

Figure 1:
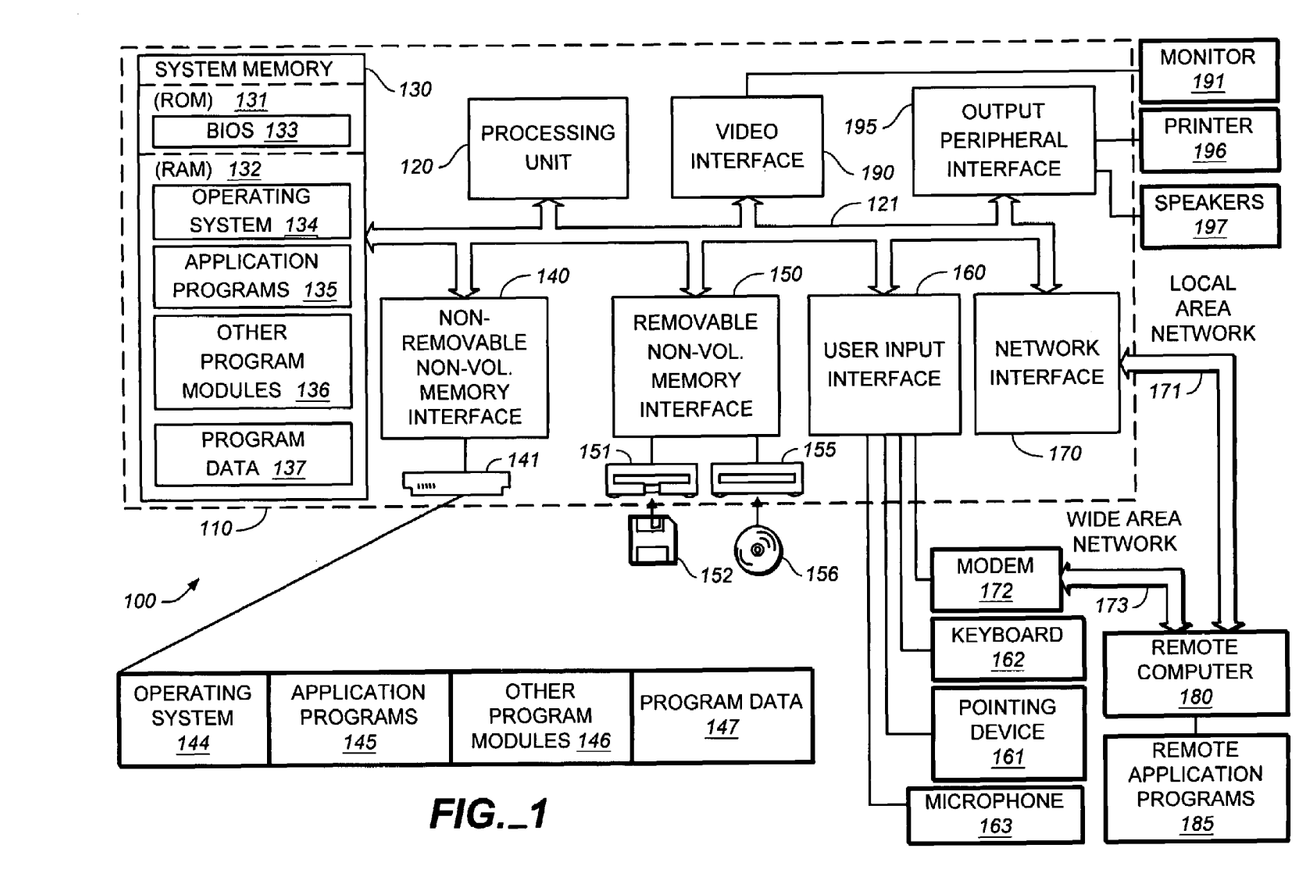
FIG. 1 is a block diagram of one illustrative embodiment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
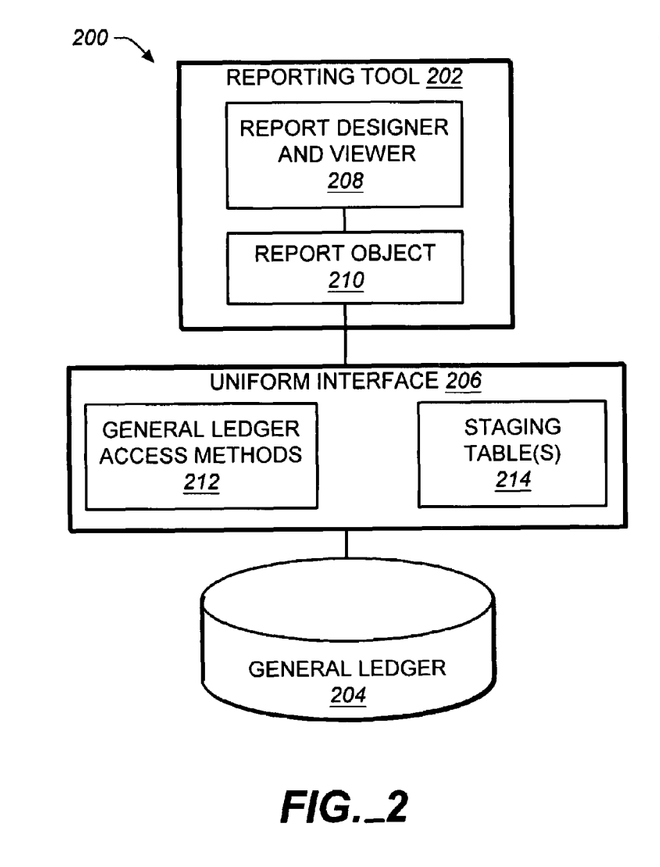
FIG. 2 is a block diagram of a financial management system utilizing a uniform interface in accordance with an embodiment of the present invention.

FIG. 2 is a block diagram of a financial management system 200 that employs a uniform interface that utilizes staging tables in accordance with an illustrative embodiment of the present invention. System 200 includes a reporting tool 202, a general ledger (GL) 204 and a uniform interface 206 between reporting tool 202 and general ledger 204. As can be seen in FIG. 2, reporting tool 202 includes a report designer and viewer 208 and a report object or engine 210. Report designer and viewer 208 is a front-end tool, which is utilized by a financial system user to design and view different reports. Report engine or object 210 launches internal processes, transparent to the user, which result in retrieval of data from general ledger 204 via uniform interface 206.

More specifically, report object 210 provides a generalized request (non-database/non general-ledger-specific request), formed using information entered by the user into report designer and viewer 208, to uniform interface 206 which, based on information included in the generalized request, accesses data from general ledger database 204 and returns the accessed data to report object 210. Uniform interface 206 essentially includes a plurality of general ledger access methods 212 that translate the generalized request into a specific query, which typically includes sequential query language (SQL) statements, that retrieves the necessary data from general ledger 204.

In accordance with the present invention, the retrieved or accessed data is stored in staging table(s) 214 before it is returned to report object 210. Data returned to report object 210 is displayed to the user via designer and viewer 208. In embodiments of the present invention, staging table(s) 214 are temporary tables, which are created, populated and dropped by the execution of one or more of general ledger access methods 212. In other embodiments of the present invention, staging table(s) 214 may be permanent tables that are updated by SQL statements or database functions, which may be activated each time general ledger database 204 is updated. It should be noted that a structure of staging table(s) 214 is independent of (or not tied to) a structure or business rules of any particular general ledger database (such as 204).

Figure 3:
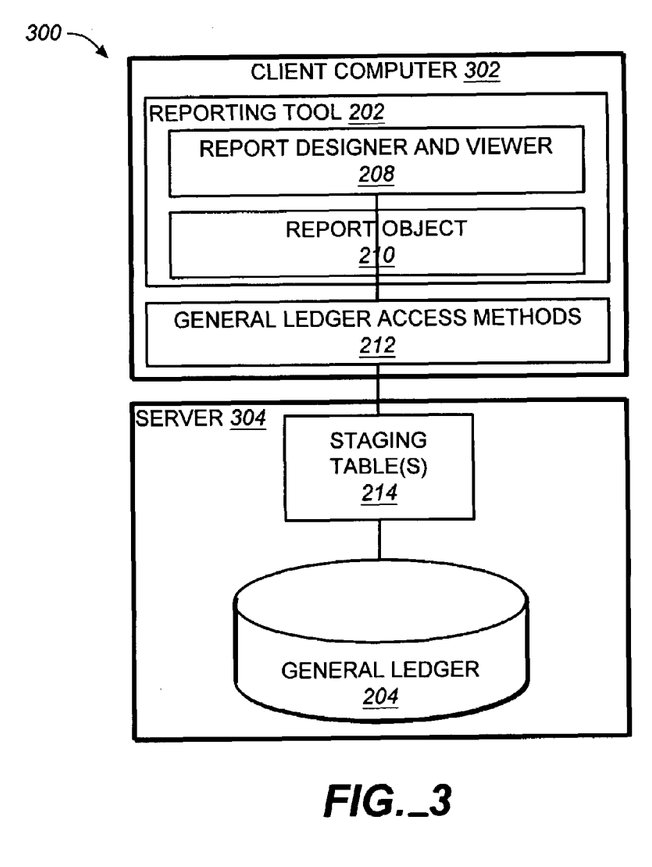
FIG. 3 is a block diagram of a client server implementation of an embodiment of the present invention.

In the interest of simplification, in FIG. 2, staging tables 214 are shown as being a part of uniform interface 206. However, in some embodiments of the present invention, general ledger access methods 212 and staging tables 214 may each be on separate computers. For example, general ledger access methods 212 may be located on a client computer and staging table(s) 214 may be located on a server along with general ledger 204. FIG. 3 shows such a configuration 300 where reporting tool 202 and general ledger access methods 212 are on a client computer 302 and staging table(s) 214 and general ledger 204 are on a server 204.

To carry out the present invention, at a minimum, general ledger access methods 212 should be able to insert data into, and access data from, staging table(s) 214 irrespective of their physical location. A more detailed embodiment of the present invention, which relies on the creation of multiple staging tables by one or more of general ledger access methods 212, is described below in connection with FIG. 4.

Figure 4:
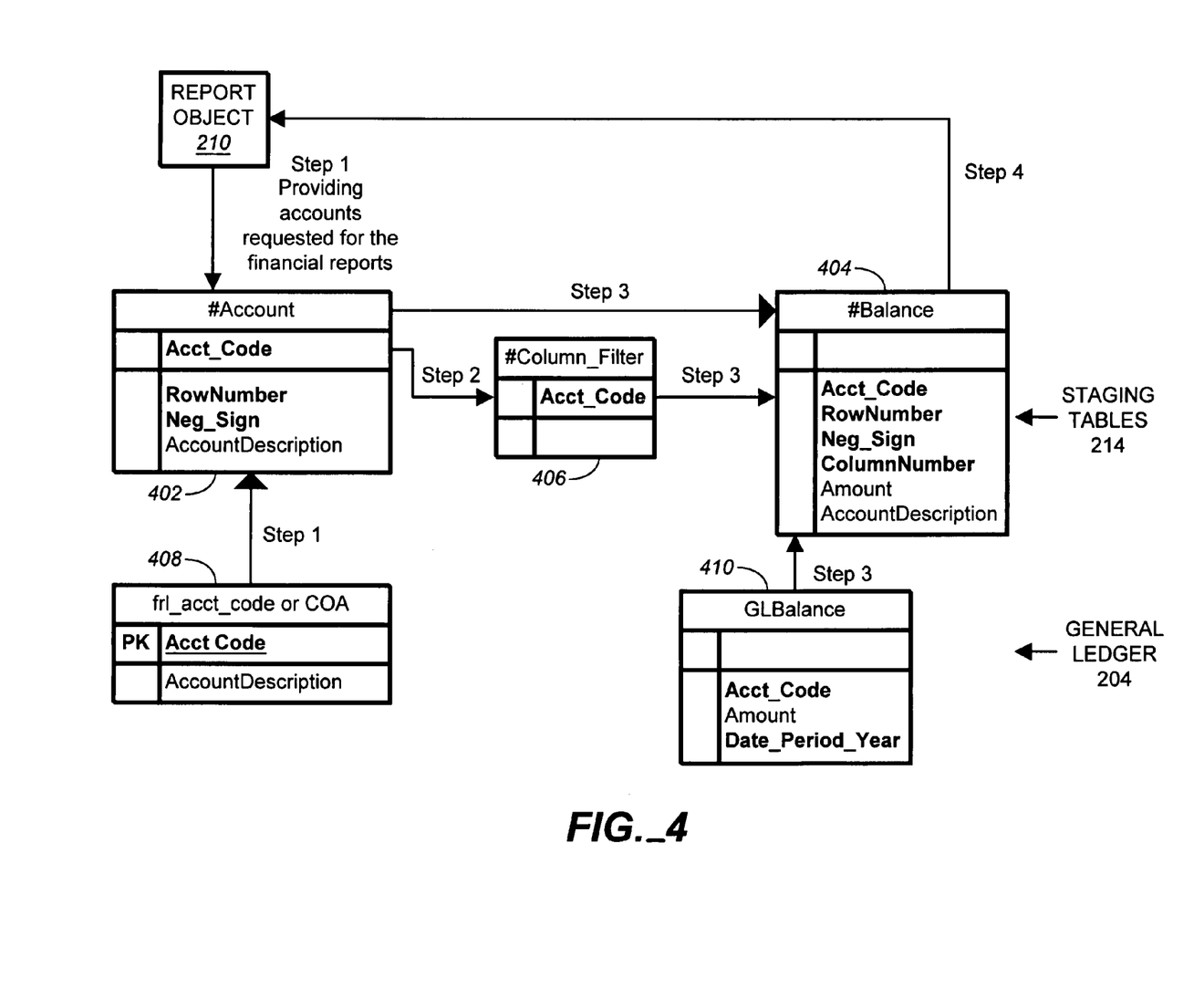
FIG. 4 is a block diagram showing how general ledger data is provided to a reporting tool by using staging tables in accordance with one embodiment of the present invention.

FIG. 4 is a block diagram showing how general ledger data is provided to report object 210 using staging tables in accordance with one embodiment of the present invention. The embodiment of the present invention shown in FIG. 4 relies on the creation of two staging tables for most reports with the possibility of a third table if column filtering is required. These staging tables may be temporary tables or permanent tables. For the examples discussed below, the staging tables are illustrated as temporary structures. In this embodiment of the present invention, the staging tables that are created are:

- Account staging table (designated by reference number 402 in FIG. 4)
- Balance staging table (designated by reference number 404 in FIG. 4)
- Column-filter staging table (designated by reference number 406 in FIG. 4)

Method Steps

The four-step process for general ledger data retrieval in accordance with the specific embodiment of the present invention shown in FIG. 4 is as follows:

1. Create and populate account staging table 402 with the accounts required for the report. This is typically carried out by inserting records from a chart-of-accounts table 408 of general ledger database 204 (or an frl_acct_code table if a server based index is used). In general, a server based index is a table that includes all valid accounts for an entity or entities from chart-of-accounts table 408 of general ledger database 204, with the information being translated into a format that report object 210 can read. Report object 210 provides the account information as to those accounts required on the specific report interface 206. This step is essentially intended to translate account masks, ranges, etc. into fully quantified account codes. Details regarding the translation of account masks, codes, etc. are provided further below in connection with FIGS. 5A-5D.
2. Create and populate column-filter staging table 406 with any account filters (if necessary).
3. Create and populate balance staging table 404 with balance information requested from the report (joining account staging table 402 with column-filter staging table 406 and with balance table 410 of general ledger 204). It should be noted that if the report requests transaction details, the staging tables are also joined against transaction table(s) (not shown) of general ledger 204.
4. Return the result set to report object 210 for rendering in a drilldown viewer.

It should be noted that, in some embodiments, the creation of these tables could occur in a single step.

FIGS. 5A-5D illustrate user interface displays to further illustrate the operation of the present invention. Details regarding staging tables 402, 404 and 406, and examples that illustrate the operation of the present invention are described below in connection with FIG. 4 and FIGS. 5A-5D. Data for the examples provided below has been arbitrarily selected to represent typical general ledger information.

Account Staging Table

The purpose of account staging table 402 is to represent all accounts that are needed for specific rows of the report. (See SetAccounts in Appendix A). Instead of joining the entire chart-of-accounts table 408 against balance table 410 of general ledger 204, the requested accounts are placed in a staging table and thereby decrease the size and complexity of the join required by typical prior art general ledger reporting systems.

Depending on a set of options defined for a specific interface 206 (see GetOFSIOptions in Appendix A), account staging table 402 may have the following columns:

1. Row number (RowNumber) as supplied from report object 210 (Internal).
2. NegSign (Neg_Sign) as supplied via report object 210 (Internal).
3. Account Code (acct_code) the actual account codes that make up the account mask/range of the row (column H in FIG. 5A).
4. Acct_ID—some general ledger systems store information by an account identification key and not the account code.
5. Acct_Desc—the account's description.

It should be noted that the account code field (acct_code) in account staging table 402 should reflect the maximum account length for the general ledger implementation. Additionally, to reduce the size of account staging table 402, account descriptions should be included only if the report requests this detail.

Figure 5A:
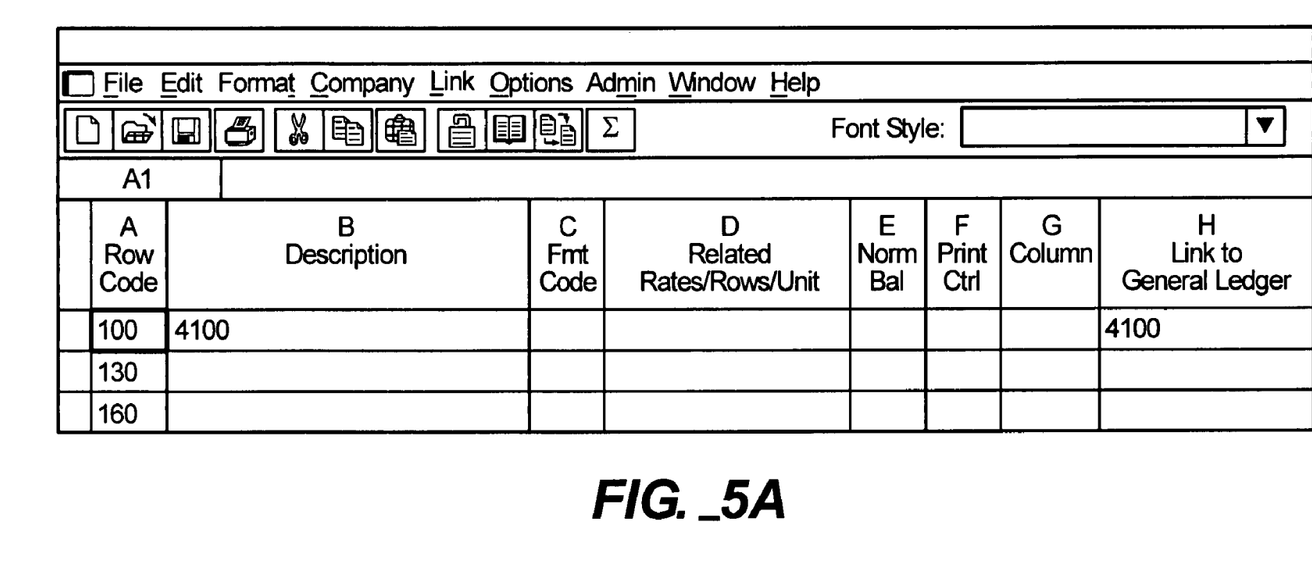
FIGS. 5A-5D illustrate user interface displays to further illustrate the operation of the present invention.

In the following example, used to illustrate the operation of the present invention, account codes having a 4-4-3 segment structure with the second segment representing the natural account are used. As can be seen in FIG. 5A, the row format is requesting all of the accounts with a 4100 natural account. Report object 210 passes the following information to uniform interface 206. (See SetAccounts in Appendix A)

| RowNumber | Neg_Sign | acct_code |
|---|---|---|
| 1 | 0 | ????4100??? |

Since there are multiple natural accounts that match the above criteria, uniform interface 206 populates account staging table 402 with the following results.

| RowNumber | Neg_Sign | acct_code |
|---|---|---|
| 1 | 0 | 00004100000 |
| 1 | 0 | 11004100001 |
| 1 | 0 | 11004100002 |
| 1 | 0 | 11004100012 |
| 1 | 0 | 12004100003 |
| 1 | 0 | 12004100004 |
| 1 | 0 | 21004100001 |
| 1 | 0 | 21004100002 |
| 1 | 0 | 22004100003 |
| 1 | 0 | 22004100004 |

Balance Staging Table

The purpose of balance staging table 404 is to store the balance information of the report being executed. By joining account staging table 402 against balance table 408 of general ledger database 204 and inserting the results into balance staging table 404, an entire report column can be retrieved with one SQL statement instead of issuing a SQL statement for each row/column intersection of a report.

Report object 210 supplies details such as book codes and/or period/year or date information as well as bucket types for each column of the report to uniform interface 206. This data is then transformed into a valid SQL statement with the column filters typically comprising the "WHERE" clause of the SQL statement.

For example, SQL . . . WHERE Year=2003 AND Period=12 AND Posting="ACTUAL"

Balance staging table 404 stores the required information for report columns such as:
1. Row number, (RowNumber).
2. Neg_Sign (Neg_Sign).
3. Account Code (acct_code).

Additional fields are as follows:
4. The AccountDescription field is an account description (Fully qualified account) that typically would store the description of the account from the frl_acct_code table if using a server based index or the chart-of-accounts table in general ledger 204.
5. The ColumnNumber field corresponds to the column of the report being executed and allows uniform interface 206 to identify which column individual balances belong to. (FIG. 5B)
6. The Amount field is the actual dollar amount from balance table 410 within general ledger database 204 for the row/column intersection of the report.

Figure 5B:
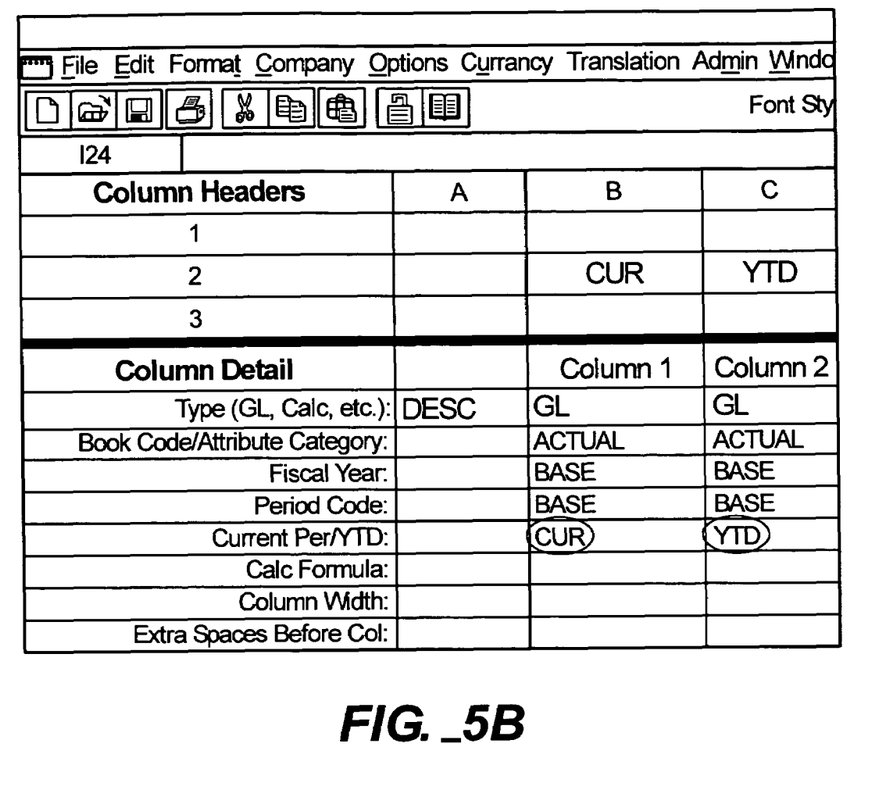

Example data types for columns of balance staging table 404 are as follows:
RowNumber smallint NOT NULL,
Neg_Sign tinyint NOT NULL,
acct_code char(11) NOT NULL,
AccountDescription varchar(100) NULL,
ColumnNumber smallint,
Amount float In this example, the following balance information is returned. Notice that the ColumnNumber reflects the start with the first general ledger column (B) versus the description column (A) from the report above (FIG. 5B).

| RowNumbr | Neg_Sign | acct_code | AccountDescription | ColumnNumber | Amount |
|---|---|---|---|---|---|
| 1 | 0 | 11004100001 | Sales-Retail-Denver | 1 | −168565 |
| 1 | 0 | 11004100001 | Sales-Retail-Denver | 1 | −337130 |
| 1 | 0 | 11004100001 | Sales-Retail-Denver | 1 | −168565 |
| 1 | 0 | 11004100002 | Sales-Wholesale-Denver | 1 | −54655 |
| 1 | 0 | 11004100002 | Sales-Wholesale-Denver | 1 | −109310 |
| 1 | 0 | 11004100002 | Sales-Wholesale-Denver | 1 | −54655 |
| 1 | 0 | 11004100012 | Sales-International-Wholesale | 1 | −568064 |
| 1 | 0 | 11004100012 | Sales-International-Wholesale | 1 | −1136128 |
| 1 | 0 | 11004100012 | Sales-International-Wholesale | 1 | −568064 |
| 1 | 0 | 12004100003 | Sales-Service-Lab-Denver | 1 | −42898 |
| 1 | 0 | 12004100003 | Sales-Service-Lab-Denver | 1 | −85796 |
| 1 | 0 | 12004100003 | Sales-Service-Lab-Denver | 1 | −42898 |

-continued

| RowNumbr | Neg_Sign | acct_code | AccountDescription | ColumnNumber | Amount |
|---|---|---|---|---|---|
| 1 | 0 | 12004100004 | Sales-Service-Studio-Denver | 1 | −20337 |
| 1 | 0 | 12004100004 | Sales-Service-Studio-Denver | 1 | −40674 |
| 1 | 0 | 12004100004 | Sales-Service-Studio-Denver | 1 | −20337 |
| 1 | 0 | 21004100001 | Sales-Retail-S.F. | 1 | −151948 |
| 1 | 0 | 21004100001 | Sales-Retail-S.F. | 1 | −303896 |
| 1 | 0 | 21004100001 | Sales-Retail-S.F. | 1 | −151948 |
| 1 | 0 | 21004100002 | Sales-Wholesale-S.F. | 1 | −53080 |
| 1 | 0 | 21004100002 | Sales-Wholesale-S.F. | 1 | −106160 |
| 1 | 0 | 21004100002 | Sales-Wholesale-S.F. | 1 | −53080 |
| 1 | 0 | 22004100003 | Sales-Service-Lab-S.F. | 1 | −28726 |
| 1 | 0 | 22004100003 | Sales-Service-Lab-S.F. | 1 | −57452 |
| 1 | 0 | 22004100003 | Sales-Service-Lab-S.F. | 1 | −28726 |
| 1 | 0 | 22004100004 | Sales-Service-Studio-S.F. | 1 | −17795 |
| 1 | 0 | 22004100004 | Sales-Service-Studio-S.F. | 1 | −35590 |
| 1 | 0 | 22004100004 | Sales-Service-Studio-S.F. | 1 | −17795 |
| 1 | 0 | 11004100001 | Sales-Retail-Denver | 2 | −7400612 |
| 1 | 0 | 11004100002 | Sales-Wholesale-Denver | 2 | −2340112 |
| 1 | 0 | 11004100012 | Sales-International-Wholesale | 2 | −2.6E+07 |
| 1 | 0 | 12004100003 | Sales-Service-Lab-Denver | 2 | −1836716 |
| 1 | 0 | 12004100004 | Sales-Service-Studio Denver | 2 | −870748 |
| 1 | 0 | 21004100001 | Sales-Retail-S.F. | 2 | −6692784 |
| 1 | 0 | 21004100002 | Sales-Wholesale-S.F. | 2 | −2272648 |
| 1 | 0 | 22004100003 | Sales-Service-Lab-S.F. | 2 | −1229876 |
| 1 | 0 | 22004100004 | Sales-Service-Studio-S.F. | 2 | −761872 |

The population of balance staging table 404 took place in two SQL queries against balance table 410 of general ledger 204; one query to bring back current information (Column 1) and the other to bring back year-to-date (YTD) information (Column 2).

Figure 5C:
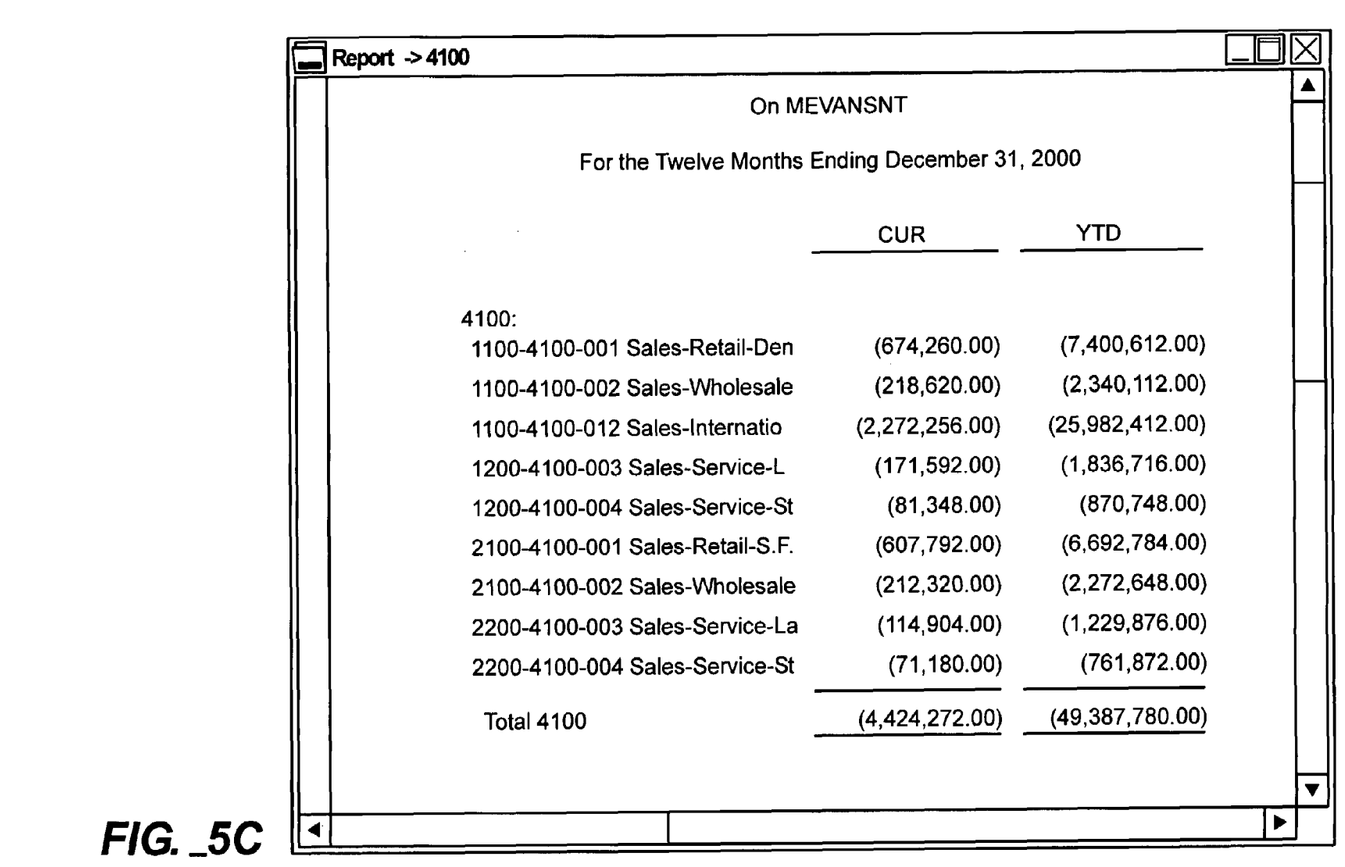
Figure 5D:
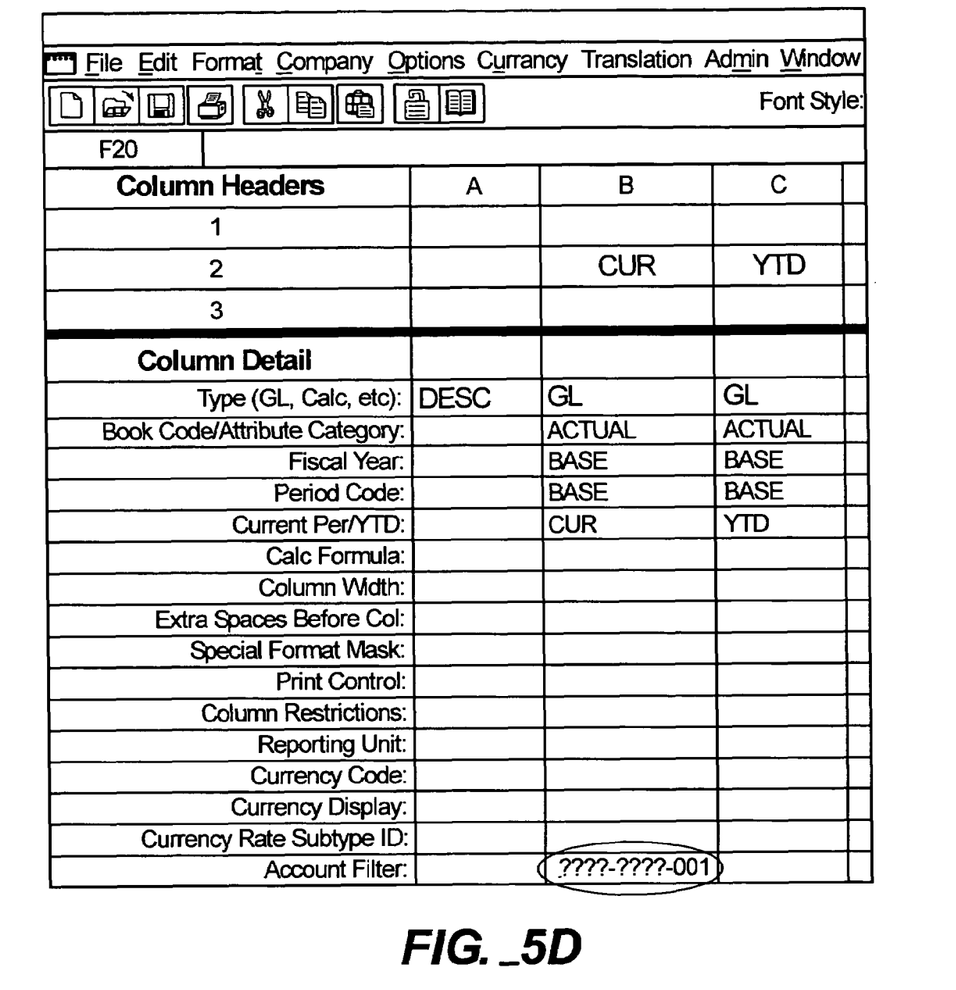

The data from balance staging table 404 is then returned to report object 210 to provide the balances required for the specific report (FIG. 5C). If the report requires transaction details, account staging table 402 could then be joined against the general ledger transaction table(s) (not shown), which may include unposted transactions, to effectively limit the number of transactions returned. (See PopulateBalances/PopulateTransactions in Appendix A).

Column-filter Staging Table

While prior art reports return the accounts for each row/column intersection, a user may wish to limit a column of the report to a specific account, a range of accounts or an account mask.

Using the same report, adding the account filter of ????-????-001 (FIG. 5D) invokes the creation of another staging table entitled column-filter (designated, as mentioned above, by reference number 406). This table identifies the accounts that match the filter criteria. (See SetBalanceFilters in Appendix A). Note that this is a filter and does not specify that the column should be overridden to have values not specified in account staging table 402.

Column-filter staging table 406 can be created as follows:
Create table Column_Filter
(acct_code CHAR(11) NOT NULL)

In addition to having an account code field (acct_code), column-filter staging table 406 would optionally have an account identification field (acct_id) if general ledger system 204 used primary/foreign keys to identify balances and transactions.

As the relational database statement (e.g. the SQL statement) to populate balance staging table 404 is dynamically created by uniform interface 206, a check is carried out to determine whether the column, for which the SQL statement is being built, has account filters on it. If the column includes account filters, column-filter staging table 406 is created and populated with the accounts that match the account filter criteria.

Column-filter staging table 406 is then included in the join between account staging table 402 and balance table 410 of general ledger 204 to provide additional filtering of the balances inserted into balance staging table 404 to match the report request.

It should be noted that, depending on how well indexed the chart-of-accounts table is, it may be faster to populate column-filter staging table 406 by using the data from account staging table 402. Typically, column-filter staging table 406 will contain fewer records then chart-of-accounts table 408.

In some embodiments, column-filter staging table 408 may be eliminated altogether and the WHERE clause of the SQL statement generated to populate balance staging table 404 would include the account filters. The following examples illustrate column filtering with (Example 1) and without (Example 2) using data from account staging table 402.

EXAMPLE 1

Records from account staging table 402 that give account codes that match the "001" criteria are acct_code
11004100001
21004100001

EXAMPLE 2

Column filtering directly against chart-of-accounts table 408 yields the following account codes.
11004100001
11004110001
11004250001
11004500001

11005000001
11005200001
11005250001
11005300001
21004100001
21004110001
21004250001
21004500001
21005000001
21005200001
21005250001
21005300001

Note the difference in the number of records returned in Example 1 versus going against chart-of-accounts table 408 (Example 2). Also note that accounts like 11004110001 are not in the row format (FIG. 5A) and therefore would not be included in the report.

When balance staging table 404 is populated, column-filter staging table 404 is joined with account staging table 402 on the acct_code/acct_id field. This limits the result set to exclude those accounts that do not match the accounts identified in both the account and the column filter. Column-filter staging table 406 is truncated and re-populated for each account filter identified in the column layout that requires filtering of accounts to the column.

Thus, the present invention, described above, provides a technique for general ledger data retrieval by utilizing staging tables (such as 402, 404 and 406) having a standardized structure, which is not tied to a structure or business rules of any particular general ledger system.

Although the present invention has been described with reference to particular embodiments, workers skilled in the art will recognize that changes may be made in form and detail without departing from the spirit and scope of the invention.

---

GetOFSIOptions

| | |
|---|---|
| Method Declaration | GetOFSIOptions(pOFSIoptions As OFSIOptions) As Boolean |
| Purpose | The GetOFSIOptions method tells the client what options are supported by this Direct Link Server. |
| Parameters | pOFSIOptions (Returned) - OFSIOptions object containing the support status of various server options and how they are supported. |
| Return | TRUE if the data is retrieved. FALSE if no data is retrieved. |

SetAccounts

| | |
|---|---|
| Method Declaration | SetAccounts(pAcctMethod As Integer, paAcct1( ) As object, pfEOF As Boolean) As Boolean |
| Purpose | The SetAccounts method defines how the accounts for this Ledger query are defined. There are two methods of getting the accounts:<br>(1) Account Criteria Provided - If Account Criteria supported, FRx will provide account ranges and wildcards to be used to determined the appropriate accounts and the Direct Link will have to obtain the accounts. If Account Criteria is not supported-FRx will determine the accounts to be include in the ledger query and will provide full account codes to the Direct Link.<br>(2) Account Types Provided - FRX will provide account types (with wildcards). Accounts with these account types should be included. The Direct Link will have to determine the accounts. |
| Parameters | pAcctMethod - This determines the method the accounts will be determined from. Values are:<br>frxAcctCriteria (1)<br>frxAcctsByAcctTypes (2)<br>The remaining parameter varies in content based on the pAcctMethod.<br>If pAcctMethod = frxAcctCriteria, paAcct - Array of AcctCriteria class objects<br>If pAcctMethod = frxAcctsByAcctTypes, paAcct - Array of AcctType class objects.<br>pfEOF - All account criteria will be set at one time with 1 to N calls to SetAccounts. Once all account criteria has been set, FRx will set this flag to TRUE. |
| Return | TRUE if processed successfully. FALSE if not processed successfully Error raised if error occurs durina the setting. |

PopulateBalances

| | |
|---|---|
| Method Declaration | PopulateBalances( ) As Boolean |
| Purpose | The PopulateBalances method notifies Direct Link Interface (OFSI) that Ledger Criteria, Account Criteria, and Balance Filters are set and GetNextBalance is about to be called. |
| Parameters | NA |
| Return | TRUE if the data is retrieved. FALSE if no data is retrieved. Error raised if error retrieved during retrieval. |

PopulateTransactions

| | |
|---|---|
| Method Declaration | PopulateTransactions(pnTranPhases As Long, pTranFieldsToFill As Long) As Boolean |
| Purpose | The PopulateTransactions method sets up the selection process for retrieving ledger transactions using GetNextTran. |
| Parameters | pnTranPhases - If the Direct Link (OFSI) option Ledger Unposted Transactions Support is FALSE, this can be ignored. If TRUE and the Direct Link option Unposted Transaction Phases Defined is FALSE, the values for this parameter could be:<br>2 - Posted Only<br>4 - Unposted Only<br>If both Direct Link Options are TRUE, the values for this parameter are based on BIT-anding of values of the Unposted Phased Defined and 2 for Posted.<br>pTranFieldsToFill - At a minimum the RowNum, NegSign, AcctCode, ApplyDate, RptngAmt, and TranDesc are returned for each transaction record. To retrieve additional transaction data, we use BIT-anding with the following values for the additional data:<br>Year - 2<br>Period - 4<br>BookCode - 8<br>ProjCategory - 16<br>ProjCode - 32<br>OrigAmt - 128<br>CurrCode - 256<br>ConvRate - 512<br>BatchID - 1024<br>SequenceNum - 2048<br>EntryDate - 4096<br>AlternateDate - 8192<br>SourceID - 16384<br>SourceDocID - 32768<br>SourceDocCode - 65536<br>SourceBatchDesc - 131072<br>AltEntityCode - 262144<br>TranType - 524288<br>CompCode - 1048576<br>AcctID - 2097152<br>VDT1 - 4194304<br>VDT2 - 8388608<br>VDT3 - 16777216<br>VDT4 - 33554432<br>VDT5 - 67108864<br>So, if you want OrigAmt, CurrCode, and ConvRate, pTranFieldsToFill would be 896 (128 + 256 + 512). If you wanted all the transaction data, pTranFieldsToFill would be 4194304 (all values added together). This parameter is only valid for pDetailLevel 3. |
| Return | TRUE if processed successfully. FALSE if not processed successfully. Error raised if error occurs during the setting. |

-continued

SetBalanceFilters

| | |
|---|---|
| Method Declaration | SetBalanceFilters(paBalFilters( ) As BalanceFilter, pDetailLevel As Integer, pfSendNoZeroBalAccts As Boolean, pnLedgerSet As Long) As Boolean |
| Purpose | The SetBalanceFilters method provides the balance filters. The Balance Filters define the time frame for the balances, book code, currency, debits/credits only, and any additional filtering by account or project. The balance filters should be analyzed to determine the minimum number of passes necessary to get all the amounts for the ledger query. |
| Parameters | paBalFilters - Array of BalanceFilter class objects. pDetailLevel - Defines the detail level for balance data and if transactions data is requested. 1 - Sum all accounts balances into one balance record 2 - Return all account balance records. 3 - Return all account balance records and transactions detail will also be returned. pfSendNoZeroBalAccts - If TRUE, accounts where all the Balance Amounts are zero will not be returned. If FALSE, for each account determined in SetAccounts a balance object is returned via GetNextBalance. pnLedgerSet - Identifies which ledger set within ledger criteria these balance filters apply to. |
| Return | TRUE if processed successfully. FALSE if not processed successfully Error raised if error occurs during the setting |

What is claimed is:

1. A computer system comprising:
   a processor;
   a computer storage medium accessible by the processor, the computer storage medium including components stored thereon, the components comprising:
   a uniform interface that is independent of any user interface, having a set of defined options that are independent of any user interface options, configured to receive a generalized request from a report object and, based upon information included in the generalized request, access data from a general ledger database and return the accessed data to the report object, the report object being configured to operate without directly accessing the general ledger database;
   wherein at least one staging table, having a standardized structure which is independent of business rules of the general ledger database, is utilized by the uniform interface to store at least a portion of the accessed data;
   wherein the uniform interface is further configured to access the data from the general ledger database by translating the generalized request into a specific query which, upon execution, populates the at least one staging table with the accessed data;
   wherein the uniform interface is further configured to, in response to the generalized request, query the at least one staging table to retrieve the accessed data and to return the accessed data to the report object after execution of the specific query that populates the at least one staging table;
   wherein columns in the at least one staging table are related to the set of defined options of the uniform interface;
   wherein the at least one staging table comprises an account staging table that is configured for storing data related to accounts for an entity, a balance staging table that is configured for storing data related to requested balance information and a column-filter staging table configured for storing data related to filtered accounts;
   wherein the accessed data obtained from the general ledger database, stored in the at least one staging table, and returned to the report object comprises data from the account staging table, the balance staging table and the column-filter staging table; and
   wherein the uniform interface comprises computer program code stored on the computer storage medium and executable by the processor of the computer system.

2. The computer system of claim 1 wherein the generalized request includes at least one natural account, and wherein the at least one natural account is translated into at least one account code, which is stored in the account staging table, with the help of the uniform interface.

3. The computer system of claim 2 wherein the specific query, into which the generalized request is translated by the uniform interface, comprises a single sequential query language (SQL) statement that joins the account staging table with a balance table of the general ledger database, such that balance information for an entire report column is retrieved by execution of the single SQL statement.

4. The computer system of claim 3 wherein the balance information comprises current balance amounts for each account code in the account staging table.

5. The computer system of claim 3 wherein the balance information comprises year-to-date balance amounts for each account code in the account staging table.

6. The computer system of claim 3 wherein the generalized request further comprises account filter criteria, and wherein a WHERE clause of the single SQL statement is configured to include the account filter criteria.

7. The computer system of claim 1 wherein the generalized request includes at least one natural account and account filter criteria, and wherein, with the help of the uniform interface, the at least one natural account is translated into at least one account code, which is stored in the account staging table, and wherein account codes that match the account filter criteria are stored in the column-filter staging table.

8. The computer system of claim 7 wherein the specific query, into which the generalized request is translated by the uniform interface, comprises a single sequential query language (SQL) statement that joins the account staging table with the column-filter staging table and with a balance table of the general ledger database, such that balance information for an entire report is retrieved by execution of the single SQL statement.

9. The computer system of claim 8 wherein the balance information comprises current balance amounts for each account code in the account staging table.

10. The computer system of claim 8 wherein the balance information comprises year-to-date balance amounts for each account code in the account staging table.

11. The computer system of claim 1 wherein the at least one staging table is a temporary table.

12. The computer system of claim 1 wherein the at least one staging table is a permanent table.

13. A computer implemented method of retrieving data, from a general ledger database, to satisfy a generalized request from a report object, comprising:
   receiving, in a uniform interface that is independent of any user interface and has a set of defined options that are independent of any user interface options, the generalized request from the report object;

accessing, based upon information included in the generalized request, data from the general ledger database;

utilizing at least one staging table, having a standardized structure which is independent of business rules of the general ledger database, to store at least a portion of the accessed data on a computer storage medium before the at least the portion of the accessed data is returned to the report object from the staging table in response to the generalized requests;

wherein the report object is configured to operate without directly accessing the general ledger database;

wherein columns in the at least one staging table are related to the set of defined options of the uniform interface;

wherein the at least one staging table comprises an account staging table that is configured for storing data related to accounts for an entity, a balance staging table that is configured for storing data related to requested balance information and a column-filter staging table configured for storing data related to filtered accounts;

wherein the accessed data obtained from the general ledger database, stored in the at least one staging table, and returned to the report object comprises data from the account staging table, the balance staging table and the column-filter staging table; and wherein the uniform interface comprises computer program code stored on the computer storage medium and executable by a processor of a computer system.

14. The method of claim 13 wherein the at least one staging table is a temporary table.

* * * * *